United States Patent [19]
Morrison et al.

[11] Patent Number: 5,467,149
[45] Date of Patent: Nov. 14, 1995

[54] HIGHLY VISIBLE MARKINGS FOR CONTACT LENSES

[75] Inventors: Donald Morrison, Fairport; Daniel Abaied, Ontario, both of N.Y.

[73] Assignee: Bausch & Lomb Incorporated, Rochester, N.Y.

[21] Appl. No.: 252,374

[22] Filed: Jun. 1, 1994

Related U.S. Application Data

[63] Continuation of Ser. No. 77,178, Jun. 15, 1993, abandoned.

[51] Int. Cl.$^6$ .................................................. G02C 7/04
[52] U.S. Cl. .......................................... 351/162; 351/177
[58] Field of Search .................... 351/160 R, 160 H, 351/161, 162, 177

[56] References Cited

U.S. PATENT DOCUMENTS

| | | | |
|---|---|---|---|
| 2,034,308 | 3/1936 | Morgan | 91/67.9 |
| 2,354,772 | 8/1944 | Prange | 41/21 |
| 4,194,814 | 3/1980 | Fischer et al. | 351/160 |
| 4,219,721 | 8/1980 | Kamen et al. | 219/121 |
| 4,268,133 | 5/1981 | Fischer et al. | 351/161 |
| 4,525,044 | 6/1985 | Bauman | 351/160 |
| 4,889,421 | 12/1989 | Cohen | 351/162 |

*Primary Examiner*—Scott J. Sugarman
*Attorney, Agent, or Firm*—Katherine McGuire

[57] ABSTRACT

A method of improving the visibility of indicia marked into an optically clear surface is disclosed comprising marking a pattern of varying depths within the boundaries of the indicia.

19 Claims, 1 Drawing Sheet

HIGHLY VISIBLE MARKINGS FOR CONTACT LENSES

This is a continuation of application Ser. No. 08/077,178 filed on Jun. 15, 1993, now abandoned.

FIELD OF THE INVENTION

The present invention relates to the production of an improved indicium or indicia on the surface of articles, especially contact lenses.

BACKGROUND OF THE INVENTION

Proper identification of contact lenses is important. Since most contact lens wearers have a different prescription for each eye, the optical power of each contact lens often differs. In addition, the use of an identifying indicium or indicia on a contact lens can be used by the wearer not only as a means of distinguishing lenses from each other, but distinguishing one side of a lens from the other. For example, an indicium or indicia can be used as an inversion indicator to determine if the lens is being put in the eye correctly (i.e. with the proper side of the lens against the eye). Indicia, together, can form lot and batch numbers on the lenses for identification purposes.

Quality control personnel must be able to identify and orient the lens quickly for further inspection. Lens inspectors often have only a limited amount of time to inspect each lens. The lenses must therefore be oriented consistently to begin the inspection process. Often an indicium, or indicia on the lens, such as a logo, is used to orient the lens. Since each individual lens inspection must be done quickly, a highly visible indicium or indicia which assists the inspector in orienting the lens is important.

In many instances, the indicium is difficult to locate due to the lack of contrast between the appearance of the indicia and the lens itself. An identification mark which has sufficient contrast to be easily visible when the lens is not on the eye but relatively invisible when on the eye would be of great advantage to lens wearers, dispensing practitioners, inspectors and anyone who handles such lenses.

SUMMARY OF THE INVENTION

The present invention is a method of improving the visibility of an indicium or indicia on an optically clear surface (when the lens is not on the eye) comprising forming an indicium or indicia having a pattern of regions of varying depth within the boundaries of each indicium. In a preferred embodiment, some of the regions of each indicium are the same height as the surface of the lens. Other regions within the pattern, which may be alternating regions, do not extend to the surface of the lens, and therefore comprise a subsurface region of depressions relative to the lens surface.

DETAILED DESCRIPTION OF THE INVENTION

Figure 1:
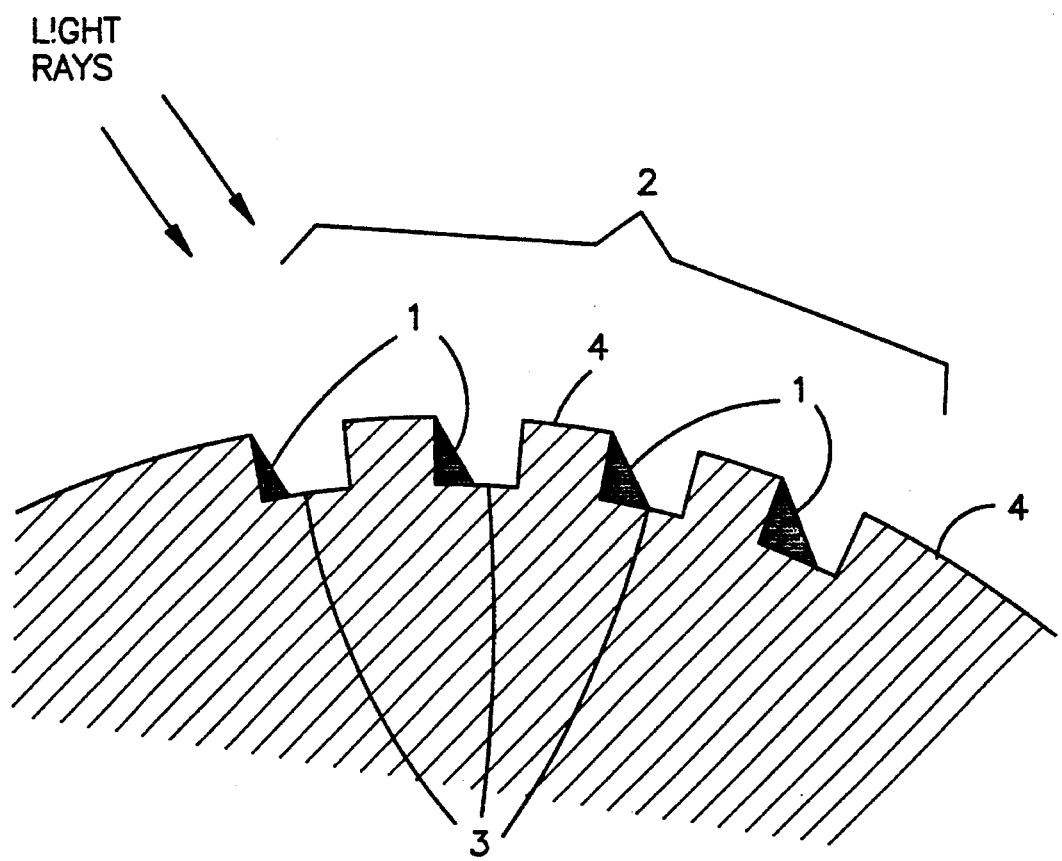
FIG. 1 shows a magnified cross-sectional view of an indicium, "B", on a contact lens

As shown in FIG. 1, a magnified cross-sectional perspective of an indicium (2) as contemplated by the present invention displays the pattern of regions of varying depth formed at or near the surface of a contact lens. It is believed that the pattern of regions of varying depth creates the conditions necessary for light to be bent in complex ways leading to areas of reflectance and absorbance. The regions of varying depth cause a series of "dark" shadowed areas (1) at the subsurface of the indicium (3) which contrast sharply with the "light" clear areas of the indicium and on the surface of the lens (4). Such contrast makes the indicium significantly more visible than the indicium ordinarily produced which has an imprint of only one depth.

Figure 2:
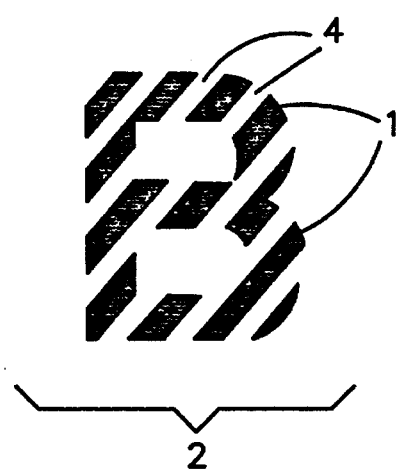
FIG. 2 shows a magnified schematic representation of an indicium, "B", according to the present invention.

FIG. 2 shows a top view of the letter "B" indicium (2). From this view the "dark" shadowed areas (1) are prominently shown, and contrast sharply with the "light" surface areas of the indicium (4).

One way of enhancing the visibility of a lens indicium formed by a single depression cut or molded into a lens surface was to increase the opacity of the depression. Such opacity, however, is the result of "roughed-up" surfaces in the depression which, in turn, increases surface area. Additional surface area is not desirable for an article such as a contact lens which must remain sterile. The microscopic crevices created by the "roughed-up" surface at the bottom of the indicium may allow biological matter and impurities to adhere and collect.

It is believed that the present invention presently benefits from the shadowed effect created by the repeating pattern of regions of varying depth which alter the path of light, or "bend" light, causing the effect of easily perceptible areas of bright regions and dark regions within the boundaries of the indicium.

It is understood that a logo may be formed by an indicium, or indicia taken together. For example, for the purposes of this application, "B&L" is a logo comprised of three indicium (collectively considered indicia). When a lens is marked, according to this invention, depressions are created along with surface regions. Both the depressions and the surface regions form a pattern, the boundaries of which form the indicium.

When an article such as a contact lens is held by a wearer in ambient light (naturally occurring light), the enhanced indicium has been shown to be easily visible. The unaided human eye appears to be able to more quickly perceive the indicium due to the contrast provided by the multiple shadowed regions of the indicium of the present invention, which show up distinctly against the transparent lens. In ambient light, the indicium may appear "whitish" or translucent to the wearer when held up to the light. Such easy location and identification of the indicium assures that the proper lens surface will be placed against the eye when the lens is inserted in the eye.

A highly visible indicium or indicia on a lens also is helpful to the practitioner who must check and match the power of the lens according to the wearer's prescription. Symbols representing lens power and other identifying information useful to the practitioner may be marked on the lens.

Similarly, the highly visible indicium of the present invention is useful to the lens quality control personnel responsible for inspection of the lenses. The additional light supplied to the instrumentation used for inspecting the lenses, appears to illuminate the indicium in such a way as to offer significant contrast as against the transparent lens being inspected. When the lens having the indicium of the present invention is inspected at magnification with additional light provided, the indicium will show clear, or white areas at the surface regions, and darker, shadowed areas at the depressions. The indicium is thus spotted quicker and easier by the inspectors, causing considerably less eye strain and fatigue. More lenses can therefore be inspected in shorter amounts of time which may significantly improve overall lens processing and quality control.

The lenses may be marked by methods well known in the tooling and contact lens field. The tools used to make the mold for cast molding procedures are often constructed of stainless steel or are stainless steel with various nickel or nickel alloy plate coatings. The tools may be treated via acid etching, laser, electrolysis, or according to other methods known by those skilled in the field to imprint the desired indicium. The tools may then be integrated into the injection molding procedures used to make the molds. The indicium therefore, according to one embodiment, is imprinted into the mold. When the monomer mix is compressed and cured between the mold halves during cast molding, or spun cast and cured, the indicium from the tool which is imprinted on the mold is transferred to the lens through methods well known to those skilled in the field.

According to one embodiment of the present invention, lasers can be used to mark lenses which are made according to other methods including cast molding. Suitable masks could be used in concert with lasers known to be effective for etching contact lens type materials, such as UV excimer lasers emitting at wavelengths of about 200 nm. The masks could conceivably have the indicium cut into them which could then be imparted to the lens. Further, laser processing may be used which does not involve the use of masks, but which directly etches the target (in this case the lens), the mold or the tool.

While parallel regions of alternating depth, which may appear as stripes, have been found to provide excellent contrast and therefore offer enhanced visibility over known indicium which are of only one depth, it is understood that many configurations, geometric and random, may produce suitable contrast and also be more visible. For example, a pattern of circles, or dots have been produced with good results of causing enhanced contrast. Indeed, any shape or pattern, both regular and repeating, or random in nature may produce the desired results, so long as the pattern comprises one region which has essentially the same surface characteristics of the surrounding substrate, and another subsurface region, or depression, which is of a depth sufficient to create suitable visible contrast.

The additional contrast and visibility provided by the indicium of the present invention on articles such as contact lenses may enable the indicium to be marked not as deeply into the surface of the lens. This would reduce the surface area where biological matter and other impurities often collect. Since the marks need not be as deep as is conventionally done, it may be possible to produce thinner lenses which may increase comfort.

The following example serves only to further illustrate aspects of the present invention and should not be construed as limiting the invention.

EXAMPLE

Process for Etching Tool Used to Make Lens Mold

The stainless steel tool was degreased by dipping the tool into a methylene chloride bath. The tool was then air dried and inspected using a microscope at 20× magnification. The tool was then handled with cotton gloves and mounted onto a spinning fixture used to hold the tool which was then attached to a motor capable of spinning the tool at a rate of 3600 RPM. The motor was engaged and the tool spun at 3600 RPM while being lowered into a cup of photo resist material (Baker 1-PR-21 analyzed positive resist 820 VSLI low particle grade) for 5 seconds. The tool was removed from the cup and spun for an additional 30 seconds. The tool was removed from the spinning fixture and inspected at 20× magnification. If any particles were detected the above procedures would be repeated. The tool was then placed in a holding rack in an oven an baked at 90 degrees C. for 15 minutes. When a nickel coated stainless steel was used, the baking time was 30 minutes. The tool was then removed from the oven, cooled and inspected under the microscope at 20× magnification.

The "B&L" logo was then etched onto the tool using UV radiation from a source at an intensity of 5 amperes. A locating means for locating the logo which was on a film mask on the tool was selected. The tool was placed in a holding means and aligned with the UV source. The tool was exposed to the UV source through the mask for 5 seconds. The tool was then removed from the holding means and dipped in the developer (100% Positive Resist Developer, OCG Micro Electronics Materials, Inc., West Patterson, N.J.) which is prepared to a concentration of 50% water/50% developer. The tool was then inspected at 20× magnification for defects. At this point, photo resist has been removed from the tool surface in the shape of the logo to be etched into the surface of the tool. The tool was then placed in a holding rack under a fume hood. A water/ferric chloride (50/50) solution was used to etch stainless steel. A nitric acid/water/hydrofluoric acid solution (5 parts/6 parts/2 parts) was used to etch a nickel coated stainless steel tool. A blunt polyethylene stick was used to dip into the acid solution, and a drop of acid was placed on the exposed logo without touching the stick to the surface of the tool, leaving acid on the tool for 2 minutes on the stainless steel (and 1 minute on the nickel coated tools). The tool was then washed with water and inspected under the microscope (20× magnification). The tool was then cleaned without wiping by dipping in acetone followed by air drying.

The finished tool was then placed into a cavity block which was placed into position in an injection molding machine used to make the contact lens mold.

Many other modifications and variations of the present invention are possible to the skilled practitioner in the field, in light of the teachings herein. It is therefore understood that, within the scope of the claims, the present invention can be practiced other than as herein specifically described.

We claim:

1. In a contact lens having at least one identifying indicium, defined by at least one indicium boundary, formed on a surface of the lens, the improvement of which comprises having a pattern of regions of varying depth within said at least one indicium boundary of said at least one identifying indicium.

2. The contact lens of claim 1 wherein said pattern of regions comprise depression regions and surface regions within said at least one boundary of said identifying indicium.

3. The contact lens of claim 2 wherein said surface regions lie at substantially the same height as said contact lens surface, and said depression regions lie below the surface of said surface regions.

4. The contact lens of claim 1 wherein said pattern of regions extend substantially parallel to one another.

5. The contact lens of claim 2 wherein said depression regions and said surface regions alternate with one another.

6. The contact lens of claim 5 wherein said depression regions and said surface regions extend substantially parallel to each other.

7. The contact lens of claim 2 wherein said depression regions and said surface regions are interconnected by interconnecting surfaces which lie substantially normal to said contact lens surface.

8. The contact lens of claim 7 wherein the surfaces of said depression regions and said surface regions lie in spaced, substantially parallel planes.

9. The contact lens of claim 4 wherein said pattern of regions extend diagonally relative to the orientation of said at least one indicium.

10. A method of enhancing the visibility of at least one identifying indicium, defined by at least one indicium boundary, formed on a contact lens surface, the method comprising forming a pattern of regions of varying depth within said at least one boundary of said identifying indicium.

11. The method of claim 10 wherein said pattern of regions comprise depression regions and surface regions within said at least one boundary of said identifying indicium.

12. The method of claim 10 wherein said pattern of regions extend substantially parallel to one another.

13. The method of claim 12 wherein said pattern of regions extend diagonally relative to the orientation of said at least one identifying indicium.

14. The method of claim 11 wherein said surface regions lie at substantially the same height as said contact lens surface, and said depression regions lie below the surface of said surface regions.

15. The method of claim 11 wherein said depression regions and said surface regions alternate with one another.

16. The method of claim 15 wherein said depression regions and said surface regions extend substantially parallel to each other.

17. The method of claim 11 wherein said depression regions and said surface regions are interconnected by interconnecting surfaces which lie substantially normal to said contact lens surface.

18. The method of claim 17 wherein the surfaces of said depression regions and said surface regions lie in spaced, substantially parallel planes.

19. The method of claim 12 wherein said pattern of regions extend diagonally relative to the orientation of said at least one indicium.

* * * * *